United States Patent [19]
Lewis

[11] 4,183,063
[45] Jan. 8, 1980

[54] ELECTRONIC SWITCHING MEANS FOR TELEVISION PROJECTION ARRANGEMENT

[76] Inventor: Earl C. Lewis, 1416 Parker St., Midland, Tex. 79701

[21] Appl. No.: 918,864

[22] Filed: Jun. 26, 1978

[51] Int. Cl.² ............... H04N 5/74; H01J 31/10
[52] U.S. Cl. .................................. 358/237; 315/399
[58] Field of Search ................ 358/237, 181, 1; 191/1 SW; 315/399

[56] References Cited

U.S. PATENT DOCUMENTS

| | | | |
|---|---|---|---|
| 2,186,570 | 1/1940 | Batchelor | 358/237 |
| 2,287,307 | 6/1942 | Herbst | 358/254 X |
| 3,800,085 | 3/1974 | Ambats et al. | 358/250 X |

*Primary Examiner*—Robert L. Richardson
*Assistant Examiner*—Aristotelis M. Psitos
*Attorney, Agent, or Firm*—George R. Douglas, Jr.; Sherman Levy

[57] ABSTRACT

A system for selectively reversing the deflection sweep to a yoke coil of a television receiver system in which a double pole-double throw (DP-DT) switch reverses the current to the deflection coil, a solenoid relay actuates the DP-DT switch, and switch control and arrangement means for energizing the solenoid relay during times when power is not applied to the television receiver system. Also the system provides for a four or more sequential position switch in which intermediate portions of the switch perform as a break-before-make (BBM) stage and the outer portions of the switch positions perform as make-before-break (MBB) stages and the switch comprises a DP-DT and a four position switch operable mechanically in tandem.

9 Claims, 3 Drawing Figures

ELECTRONIC SWITCHING MEANS FOR TELEVISION PROJECTION ARRANGEMENT

CROSS-REFERENCE TO RELATED AND PRIOR ART AS KNOWN

There are no patents relating directly to anticipating the present invention. The applicant has earlier filed a Disclosure No. P-46,382 now License No. 398,472 dated Jan. 14, 1977, which disclosure is filed under Title 35 U.S.C., Sections 184, 185 and 186. Prior art relevant to disclosures of interest only to the present invention and cannot anticipate the present invention, nor which the present invention is opined to infringe are the following U.S. Pat. Nos.: 2,413,922; Jensen, et al.; 2,438,022; Rundle; 2,510,106; Henroteau; 2,604,536; Rose; 3,800,085; Ambats, et al.; 3,943,282; Muntz.

BRIEF SUMMARY OF THE INVENTION

The present invention relates to a switch means for television projection arrangement in which a DP-DT switch when actuated reverses the picture on the television screen, the switch being actuated by a relay and in which sparking of the terminals or element of the DP-DT switch is eliminated.

More particularly the invention relates to such a system to selectively reverse the deflection sweep to a yoke coil of a television receiver system and in which sparking, damaging and other deleterious effects are eliminated by means of the improved switch means.

BACKGROUND OF THE INVENTION

Projection systems such as those known and cited in the prior art shown above have contemplated a reversing of the deflection field of the television tube. None of the prior art known has provided protective circuitry to protect the television components from damage due to sparking or inductance leakage or capacative leakage from the deflection components of the television receiver, whether within the picture tube or disposed at the yoke area of the picture tube.

In order to provide ordinary use to the television receiver as well as provide projection of the pictures using the same television receiver in the projection mode, there is required means to protect the circuit elements as well as means to eliminate electrical reactants leaking from the circuit components, whether inductive or capacative in nature. It is contemplated that a switch means in a network inserted in the power line to the television receiver system for providing a holding state when projection is desired and a given or normal state when ordinary viewing of the television receiver is desired provides elimination of sparking, reactive circuit leakages and the like when a DP-DT switch is used in the deflection circuit.

FIELD OF THE INVENTION

The object and advantage of the present invention is to provide a new and improved switch means for television projection systems and in which reactive components do not dissipate during switching operations causing large sparking defects and damage to the electrical components or danger to persons during such operation of switching.

More particularly the object and advantage of the present invention is to provide a simplistic and easily installed switching means insertable whether the power source or line source side to the television receiver system without any requirement for significantly altering or redesigning the television receiver system.

An object of the present invention is to provide a kit type or small unit device that may be installed on the back side of a television receiver, simply connected and operated so that a solenoid operates a DP-DT switch, and the switch means of the invention is readily imposed between the television receiver and the power line.

BRIEF DESCRIPTION OF THE SEVERAL VIEWS OF THE DRAWING

The above and other objects and advantages of the invention will become apparent upon full consideration of the following detailed description and accompanying drawings in which.

DETAILED DESCRIPTION OF THE PREFERRED EMBODIMENTS OF THE INVENTION

Figure 2:
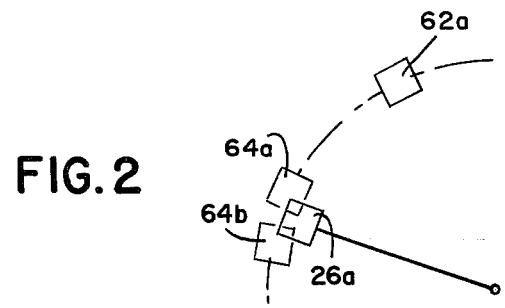
FIG. 2 shows a modified arrangement of switch contacts used to energize a solenoid relay driving a DP-DT switch prior to electrical energizing of the television receiver system and chasis and is a modification adaptable to the embodiment shown in FIG. 1.

Referring now to the drawings there is shown a television receiver system 12 in block form but in which a cathode ray tube or picture tube 14 is separately shown in the FIGURE but otherwise made part of the television receiver system 12. Also shown is a network 16 for being connected or interposed between the power line or source 20 and the television receiver 12. The network includes a power or line switch 22 shown normally closed connecting the power source 20 to the television receiver 12, and a solenoid relay switch 26 in manual tandem relation to the line switch 22 by a mechanical line or lever means 30. Through the circuit of solenoid relation switch 26 is connected a relay or solenoid relay 34 so that their elements are connected across the power line terminals from the power source 20, as is shown.

The solenoid relay 34 when energized actuates a lever arm 40 so that a double pole-double throw (DP-DT) switch 44 is displaced from a normal or given position to a holding position. Contacts a, b are closed with terminals e, f and upon the displacement by lever arm 40 by the relay 34, terminals e, f engage contacts c, d and by means of the connection of the DP-DT switch as shown, the deflection sweep applied to the yoke coil 50 is reversed. During each successive throw of the DP-DT switch the picture on the CRT 14 is accordingly reversed.

Figure 1:
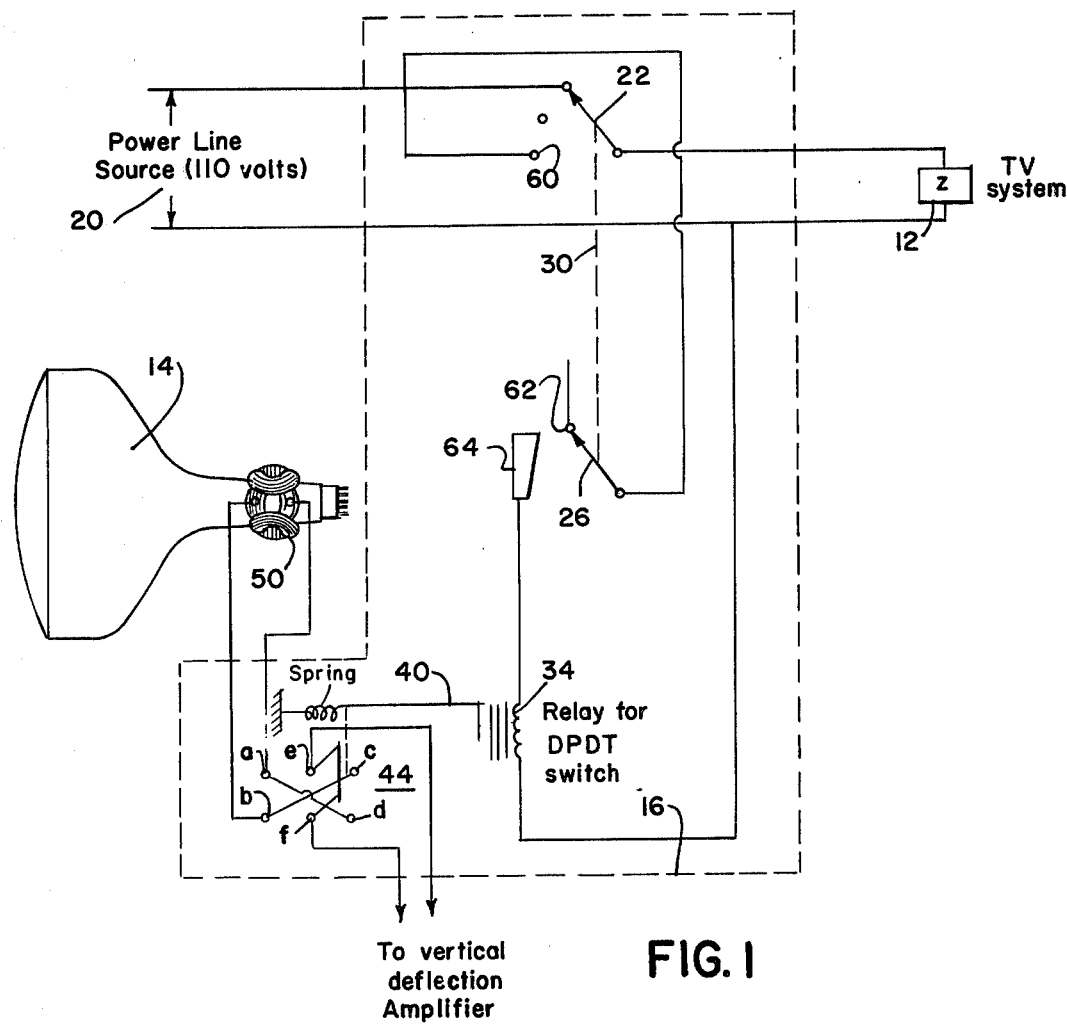
FIG. 1 is a schematic circuit diagram embodying the network interposed in a power line and having switching means in the network according to the best mode and preferred embodiments of the present invention.

The network 16 is shown interposed between the power line source 20 and the television receiver system 12 when the line switch 22 is shown in a normal or given position but when it is displaced downwardly to engage contact 60, the lever means 30 displaces relay switch 26 from engaging contact 62 so that it engages an elongated contact 64. In this way it is seen that during the arc when line switch 22 moves forward contact 60 the relay switch 26 first engages the elongated contact 64 so that circuit continuation between the power line is established for energizing relay 34, this actuates lever arm 40 as described above. When the lever arm 30 is returned to the position as shown in FIG. 1 then the solenoid relay 34 becomes de-energized, the DP-DT switch is reversed and normal or given operation of the television receiver system is resumed.

FIG. 2 shows how a pair of contacts 64a, 64b may be provided with a sweeping contact arm or brush 26a and when the brush 26a engages a contact 62a, it does not bridge with contact 64a. Thus, the sweep or brush 26a in contacting 64a, 64b, is a make-before brake (MBB) switch while the brush 26a when sweeping over and between contact 64a, 62a is a break-before-make (BBM) switch.

It is seen that by means of the present invention sparking and hazardous operation of a DP-DT switch is eliminated by the network 16 applied to DP-DT switch connected with a vertical deflection amplifier and yoke system or a horizontal deflection amplifier or yoke circuit of a cathode ray tube.

Figure 3:
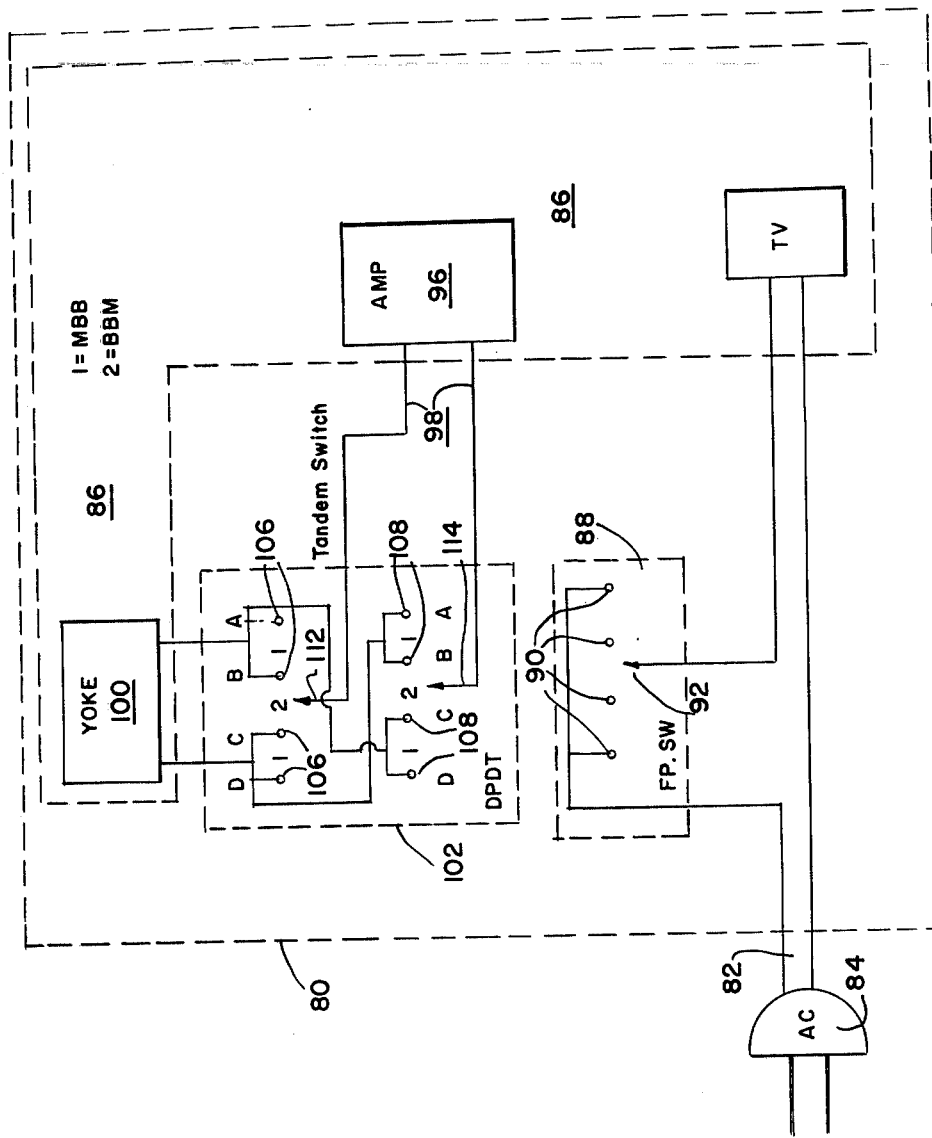
FIG. 3 is a schematic diagram of a four sequential position switch system or array performing make-before-break (MBB) function in outer sets of switches and performing break-before-make (BBM) functions in inner sets of switch thereof in accordance with another embodiment of the invention.

FIG. 3 shows in schematic form a television chasis 80, a power line 82 terminating in a plug 84 and the television receiver circuit 86. Interposed between the plug 84 and the television receiver circuit 86 is a four position sequential switch 88 having four contacts 90 as shown and a moveable contact 92. The television receiver circuit 86 is provided with a vertical deflection driver or amplifier 96, having conductors 98 for connection to the vertical deflection yoke 100. Similarly there is interposed between the vertical deflection amplifier or driver 96 and the vertical yoke 100 a switch operating in tandem with the four position sequential switch 88 and shown as a four position, double pole-double throw (DP-DT) switch 102.

The DP-DT switch 102 has four contacts 106 for one pole and four contacts 108 for the other pole, each connected to conductors 98 and for sweeping over the contacts 106, 108 in simultaneous tandem relation with a moveable contact 92. The outer contacts 106, 108 of the switch array 102 provide and perform as a make-before-break (MBB) function while the inner contacts 106, 108 perform as a break-before-make (BBM) function as the moveable contacts 112, 114 progress across the immediate contacts 106, 108. Thus, it is seen that by means of the switch array 88, 102 there is provided reversal of the vertical drive applied to yoke 100 while the power applied between the plug 84 and the television receiver circuit 86 is in an off position due to the moveable contact 92 sweeping across immediate contacts 90 of the four position sequential switch 88.

A particular form of the use of the invention is one where the home or commercial television receiver system may be dually adapted for conventional receiver use where the screen face is used as a receiver image surface, and also where there is introduced a projection television system where the image on the screen face is reversed and projected upon a white sensitized or activated screen of large dimension such as a 45-inch screen, as measured diagonally. Commercial systems of such arrangements are projection systems as found installed in taverns, bars, hotel lobbies, as well as uses in homes.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. System for selectively reversing the deflection sweep to the yoke coil of a television receiver and having a network for being interposed in the power line supply to a television receiver and in its vertical deflection yoke coil drive unit comprising a double pole-double throw (DP-DT) switch connected between a vertical deflection yoke coil of the television receiver and a vertical deflection amplifier of the television receiver, a solenoid relay when energized for switching the DP-DT switch from a given position to a holding position and switch means in the network for energizing the solenoid relay into its holding position in absence of energizing a remaining part of the television receiver.

2. The invention of claim 1 wherein said switch means delays application of the power line supply to said remaining part of the television receiver until the DP-DT switch is completely energized to prevent a sparking discharge emission of the yoke coil.

3. The invention of claim 1 wherein sparking discharge emission of the vertical deflection amplifier applied to the vertical deflection yoke occurs, if at all, during times when the television receiver is connected to the power line supply.

4. The invention of claim 1 wherein a horizontal deflection yoke coil and a horizontal deflection amplifier of the television receiver contains said network in lieu of the vertical one.

5. System for selectively reversing the deflection sweep to the yoke coil of a television receiver system and having a network for being interposed in the power line, supply to a television receiver and in its vertical deflection yoke coil drive unit comprising a double pole-double throw (DP-DT) switch connected between a vertical deflection yoke coil of the television receiver and a vertical deflection amplifier of the television receiver, a multi-position switch to energize the television receiver when either of its distal positions are engaged and for de-energizing the receiver when any of its intermediate positions are engaged, said multiposition switch mechanically coupled in tandem relation to the DP-DT switch.

6. The invention of claim 5 wherein said four position switch delays application of the power line source to said components of the television receiver until the DP-DT switch is in a make-before-break position and is completely energized so that spark discharge of the yoke coil does not occur.

7. The invention of claim 5 wherein discharge of the vertical deflection amplifier during the vertical deflection yoke occurs, if at all, during times when the television receiver is energized by the multi position switch connected to the power line supply.

8. The invention of claim 5 wherein said multi position switch is a four-position switch.

9. System for selectively reversing the deflection sweep to the yoke coil of a television receiver and having a network for being interposed in the power line supply to a television receiver and in its vertical deflection yoke coil drive unit comprising a switch array having double pole-double throw (DP-DT) having four sequential positions connected between a deflection yoke coil of the television receiver and a vertical deflection driver of the television receiver, a four sequential position switch to energize the television receiver when either of the distal positions are engaged and for de-energizing the receiver when intermediate positions are engaged, said four sequential position switch is connected as a break-before-make (BBM) and said DP-DT switch is connected as a make-before-break (MBB) switch.

* * * * *